(12) United States Patent
Lee et al.

(10) Patent No.: US 12,284,142 B2
(45) Date of Patent: Apr. 22, 2025

(54) METHOD AND APPARATUS FOR PROVIDING COUNSELING SERVICE

(71) Applicant: KAKAO CORP., Jeju-si (KR)

(72) Inventors: Ho Jun Lee, Seongnam-si (KR); Jung Han Choi, Seongnam-si (KR); Bo Mi Hong, Seongnam-si (KR); June Kwon Moon, Seongnam-si (KR); Ji Soo Hwang, Seongnam-si (KR); Hye Ryeon Lee, Seongnam-si (KR); Sang Hyeon Seo, Seongnam-si (KR); Sung Yong Chang, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 119 days.

(21) Appl. No.: 17/870,826

(22) Filed: Jul. 22, 2022

(65) Prior Publication Data

US 2023/0029014 A1    Jan. 26, 2023

(30) Foreign Application Priority Data

Jul. 26, 2021 (KR) .......................... 10-2021-0098093

(51) Int. Cl.
  *H04L 51/02* (2022.01)
  *G06F 16/903* (2019.01)

(52) U.S. Cl.
  CPC ........ *H04L 51/02* (2013.01); *G06F 16/90335* (2019.01)

(58) Field of Classification Search
  CPC .............. H04L 51/02; G06F 16/90335; G06F 16/3329; G06Q 30/0281; G06Q 50/30
  See application file for complete search history.

(56) References Cited

U.S. PATENT DOCUMENTS

2015/0294386 A1*  10/2015  Hertschuh .......... G06Q 30/0623
                                                        705/26.43
2019/0163437 A1*  5/2019  Nagasaka .............. G06Q 30/06
(Continued)

FOREIGN PATENT DOCUMENTS

KR    20130061387 A    6/2013
KR    20180022762 A    3/2018
(Continued)

OTHER PUBLICATIONS

Korean Office Action for KR Application No. 10-2021-0098093 mailed on Apr. 27, 2023.
(Continued)

*Primary Examiner* — Soe Hlaing
(74) *Attorney, Agent, or Firm* — CANTOR COLBURN LLP

(57) ABSTRACT

Provided are a method and apparatus for providing a counseling service. A method of operating a counseling center server interworking with an instant messaging service includes acquiring, based a search request for a message transmitted to a channel registered in the service, a search result of a chatbot server linked to the channel, providing an interface for inputting a value of at least one parameter included in the search result to a terminal of a counselor linked to the channel, acquiring an entity corresponding to the parameter based on the message, determining a value of the parameter based on at least one of the acquired entity and data input through the interface, and requesting, based on the determined value of the parameter, an instant messaging server configured to provide the service to transmit a response message corresponding to the search result.

18 Claims, 9 Drawing Sheets

(56) References Cited

U.S. PATENT DOCUMENTS

2020/0382464 A1* 12/2020 Keller .................. H04L 51/214
2021/0035576 A1*  2/2021 Kang ..................... G10L 15/22

FOREIGN PATENT DOCUMENTS

| KR | 20190011570 A  |  2/2019 |
|----|----------------|---------|
| KR |   101944353 B1 |  4/2019 |
| KR | 20190080599 A  |  7/2019 |
| KR | 20200134454 A  | 12/2020 |
| KR | 20210001137 A  |  1/2021 |

OTHER PUBLICATIONS

Korean Office Action for KR Application No. 10-2021-0098093 mailed on Oct. 30, 2023.

* cited by examiner

400

| Total▽ | Would you recommend some ☆ shoes for a 25-year-old woman? | Search |

☰ View list     Selected chatbot block

[👤 ooo _____]   Provide information on shoes products

Parameter

410 — Shoe model | Please select a value ▼
420 — Gender | Please select a value ▼
430 — Age | Ex) 20-year-old, 20 years old
440 — Date of receipt | Request

[Preview] [Send a reply]

FIG. 4A

```
                            ┌─400
   ┌──────┐ ┌──────────────────────────┐ ┌──────┐
   │Total▽│ │Would you recommend some ☆│ │Search│
   └──────┘ │shoes for a 25-year-old woman?│ └──────┘
            └──────────────────────────┘

┌─────────┐
   │☰View list│              Selected chatbot block
   └─────────┘
   ┌──────────────────────┐  ┌──────────────────────┐
   │ ooo                  │  │Provide information on│
   │ ───────────          │  │shoes products        │
   └──────────────────────┘  └──────────────────────┘
```

Parameter                         450
       ┌─ ─ ─ ─ ─ ─ ─ ─ ─ ─ ─ ─ ─ ─ ─ ─ ─ ─ ─ ─ ─ ─┐
 410 ──┤  Shoe model    │ Please select a value ▼ │  │
       └─ ─ ─ ─ ─ ─ ─ ─ ─ ─ ─ ─ ─ ─ ─ ─ ─ ─ ─ ─ ─ ─┘
       ┌─ ─ ─ ─ ─ ─ ─ ─ ─ ─ ─ ─ ─ ─ ─ ─ ─ ─ ─ ─ ─ ─┐  ✓
 420 ──┤  Gender        │ Female                ▼ │  │
       └─ ─ ─ ─ ─ ─ ─ ─ ─ ─ ─ ─ ─ ─ ─ ─ ─ ─ ─ ─ ─ ─┘
       ┌─ ─ ─ ─ ─ ─ ─ ─ ─ ─ ─ ─ ─ ─ ─ ─ ─ ─ ─ ─ ─ ─┐  ✓
 430 ──┤  Age           │ 25-year-old              │  │
       └─ ─ ─ ─ ─ ─ ─ ─ ─ ─ ─ ─ ─ ─ ─ ─ ─ ─ ─ ─ ─ ─┘
 440 ──┤  Date of receipt │      Request           │

FIG. 4B

| First type parameter | Second type parameter | Third type parameter |
|---|---|---|
| Age [Ex) 20-year-old, 20 years old] ~510 | Shoe model [Please select a value ▶] [Please enter your search word. 🔍 XX327 AABB CCC AS-01] ~520 | [Date of receipt] [Request] ~530 |

FIG. 5

METHOD AND APPARATUS FOR PROVIDING COUNSELING SERVICE

CROSS-REFERENCE TO RELATED APPLICATION

This application claims the benefit of Korean Patent Application No. 10-2021-0098093 filed on Jul. 26, 2021, in the Korean Intellectual Property Office, the entire disclosure of which is incorporated herein by reference for all purposes.

BACKGROUND

1. Field of the Invention

One or more example embodiments relate to a method and apparatus for providing a counseling service.

2. Description of the Related Art

Recently, with development of mobile smart devices, the use of online platform services for interaction with other users through networks is increasing. Typical examples of the online platform services for interaction with other users include a social networking service (SNS), which is an online platform that creates and strengthens social relationships through communication, information sharing, and social network expansion among users, and an instant messaging service (IMS), which is an online platform for real-time content communication among two or more users. As the interaction among users through such mobile devices increases, the online platform service supports not only a chat service for daily conversation with other users, but also a function of providing various services based on communication among a plurality of users.

Contact center as a service (CCaaS), a cloud-based service-type contact center solution, may be a service that provides an online counseling platform with various counseling functions including a chat interface and a chatbot server. There is a need for development of CCaaS technology for companies to efficiently conduct and manage counseling by applying smart technology while consumers may request non-face-to-face counseling using mobile devices in an easy and quick way.

SUMMARY

According to an aspect, there is provided a method of operating a counseling center server interworking with an instant messaging service including acquiring, based a search request for a message transmitted to a channel registered in the service, a search result of a chatbot server linked to the channel, providing an interface for inputting a value of at least one parameter included in the search result to a terminal of a counselor linked to the channel, acquiring an entity corresponding to the parameter based on the message, determining a value of the parameter based on at least one of the acquired entity and data input through the interface, and requesting, based on the determined value of the parameter, an instant messaging server configured to provide the service to transmit a response message corresponding to the search result.

The acquiring of the entity may include acquiring, from the chatbot server, a predetermined entity extracted based on a query corresponding to the message, determining a value of a first parameter mapped to the acquired entity among parameters included in the search result as a value of the acquired entity, and displaying the value of the first parameter as the value of the acquired entity on the interface.

The determining of the value of the parameter may include determining a value of a second parameter not mapped to the acquired entity among the parameters included in the search result based on the data input through the interface.

The determining of the value of the parameter may include changing the value of the first parameter determined as the value of the acquired entity based on the data input through the interface.

The determining of the value of the parameter may include receiving input of data corresponding to the parameter through the interface, checking whether the input data corresponds to an entity mapped to the parameter, and determining, based on the check result, the value of the parameter as the input data.

The requesting to transmit the response message may include creating the response message including content created based on the determined value of the parameter, and requesting the instant messaging server to transmit the response message through a chat room.

The requesting to transmit the response message may include activating a transmission request function of the response message in response to determining values of at least a part of parameters included in the search result, and requesting the instant messaging server to transmit the response message in response to the request to transmit the response message received through the interface.

The requesting to transmit the response message may include requesting the chatbot server to transmit a response message corresponding to the search result based on the determined value of the parameter, and the chatbot server may be configured to create the response message based on the determined value of the parameter and request the instant messaging server to transmit the created response message.

The acquiring of the search result may include transmitting a query corresponding to the search request to the chatbot server, and acquiring a search result including a response corresponding to the query from the chatbot server.

The providing of the interface may include at least one of providing the interface comprising a first input window for inputting a value of a first type parameter mapped with a predefined general-purpose entity, providing the interface comprising a second input window for inputting a value of a second type parameter mapped with a customized entity, and providing the interface comprising a plug-in transmission function for inputting a value of a third type parameter mapped with a predefined plug-in.

The determining of the value of the parameter may include determining the value of the third type parameter among parameters included in the search result as data received based on the plug-in.

The acquiring of the search result of the chatbot server linked to the channel may include creating a counseling center module corresponding to the channel in response to a request for opening a counseling center of the channel, linking the chatbot server linked to the channel to the counseling center module, receiving a search request for a message transmitted through a chat room of the channel included in the counseling center module, and acquiring a search result corresponding to the received search request from the chatbot server linked to the counseling center module.

The entity may include at least one of a general-purpose entity and a customized entity registered in the chatbot server.

According to another aspect, there is provided a counseling center server interworking with an instant messaging service, including at least one processor configured to acquire, based on a search request for a message transmitted to a channel registered in the service, a search result of a chatbot server linked to the channel, provide an interface for inputting a value of at least one parameter included in the search result to a terminal of a counselor linked to the channel, acquire an entity corresponding to the parameter based on the message, determine a value of the parameter based on at least one of the acquired entity and data input through the interface, and request an instant messaging server providing the service to transmit a response message corresponding to the search result based on the determined value of the parameter.

The processor may be configured to, in acquiring the entity, acquire, from the chatbot server, a predetermined entity extracted based on a query corresponding to the message, determine a value of a first parameter mapped to the acquired entity among parameters included in the search result as a value of the acquired entity, and display the value of the first parameter as the value of the acquired entity on the interface.

The processor may be configured to, in determining the value of the parameter, receive input of data corresponding to the parameter through the interface, check whether the input data corresponds to an entity mapped to the parameter, and determine the value of the parameter as the input data based on the check result.

The processor may be configured to, in requesting transmission of the response message, activate a transmission request function of the response message in response to determining values of at least a part of parameters included in the search result, and request the instant messaging server to transmit the response message in response to the request to transmit the response message received through the interface.

The processor may be configured to, in providing the interface, provide the interface comprising a first input window for inputting a value of a first type parameter mapped with a predefined general-purpose entity, provide the interface comprising a second input window for inputting a value of a second type parameter mapped with a customized entity, and provide the interface comprising a plug-in transmission function for inputting a value of a third type parameter mapped with a predefined plug-in.

The processor may be configured to, in determining the value of the parameter, determine the value of the third type parameter among parameters included in the search result as data received based on the plug-in.

The processor may be configured to, in acquiring the search result of the chatbot server linked to the channel, create a counseling center module corresponding to the channel in response to a request for opening a counseling center of the channel, link the chatbot server linked to the channel to the counseling center module, receive a search request for a message transmitted through a chat room of the channel included in the counseling center module, and acquire a search result corresponding to the received search request from the chatbot server linked to the counseling center module.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIGS. 4A and 4B are diagrams illustrating an example of an interface for parameter input according to an example embodiment;

FIG. 5 is diagrams illustrating examples of an interfacing object according to types of parameters included in an interface for parameter input according to an example embodiment;

DETAILED DESCRIPTION

Figure 1:
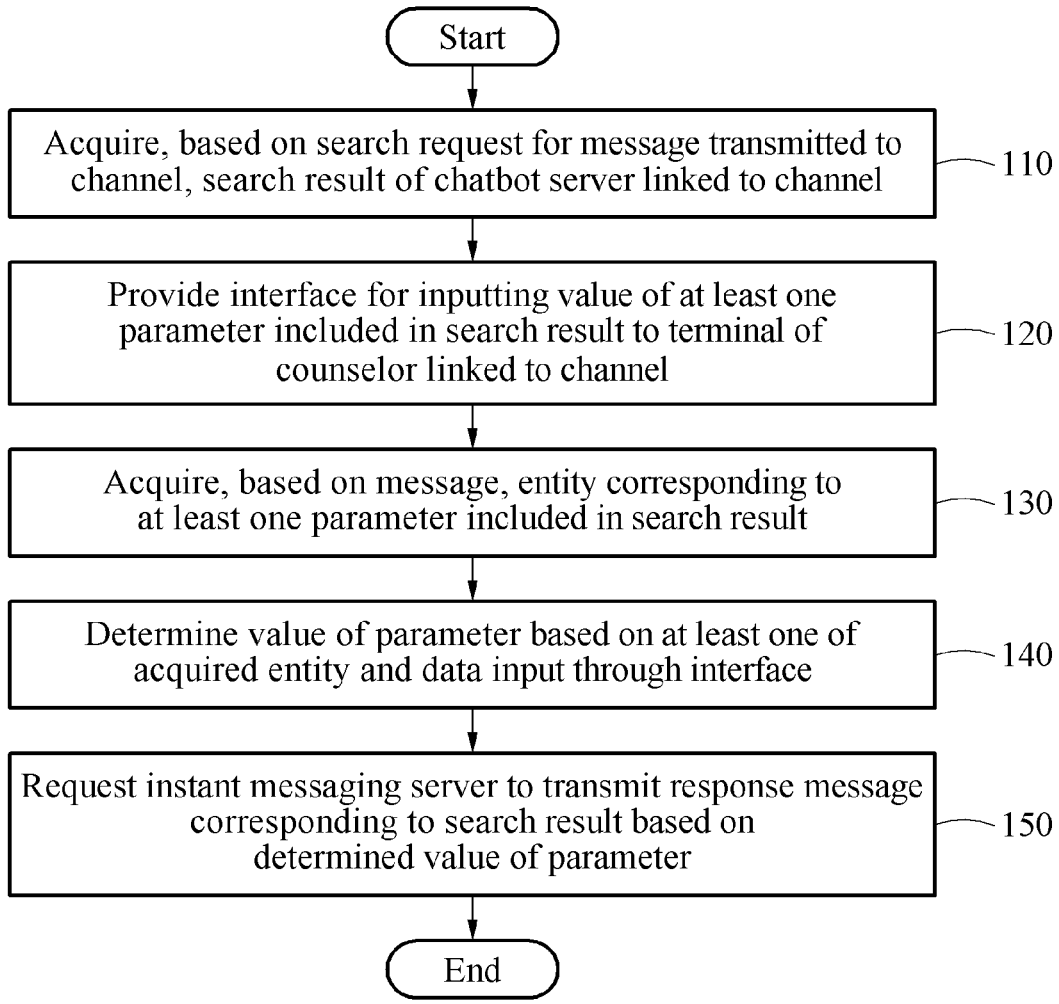
FIG. 1 is an operation flowchart illustrating a method of operating a counseling center server interworking with an instant messaging service according to an example embodiment.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

When it is mentioned that one component is "connected" or "accessed" to another component, it may be understood that the one component is directly connected or accessed to another component or that still other component is interposed between the two components.

As used herein, the singular forms "a," "an," and "the" are intended to include the plural forms as well, unless the context clearly indicates otherwise. It will be further understood that the terms "comprise" and/or "have," when used in this specification, specify the presence of stated features, integers, steps, operations, elements, components or a combination thereof, but do not preclude the presence or addition of one or more other features, integers, steps, operations, elements, components, and/or groups thereof.

Hereinafter, example embodiments will be described in detail with reference to the accompanying drawings. When describing the example embodiments with reference to the accompanying drawings, like reference numerals refer to like components and a repeated description related thereto will be omitted.

FIG. 1 is an operation flowchart illustrating a method of operating a counseling center server interworking with an instant messaging service according to an example embodiment.

Referring to FIG. 1, the method of operating a counseling center server interworking with an instant messaging service according to an example embodiment may include acquiring, based on a search request for a message transmitted to a channel, a search result of a chatbot server linked to the channel 110, providing an interface for inputting a value of at least one parameter included in the search result to a terminal of the counselor linked to the channel 120, acquiring an entity corresponding to the parameter included in the search result based on the message 130, determining a value of the parameter based on at least one of the acquired entity and data input through the interface 140, and requesting, based on the determined value of the parameter, the instant messaging server to transmit a response message corresponding to the search result 150.

According to an example embodiment, the counseling center server may correspond to a server that provides a counseling service by interworking with the instant messaging service. The counseling service is a counseling service that uses an instant messenger connected to an instant messaging server providing an instant messaging service as a counseling medium, and a user may use the counseling service by subscribing to the instant messaging service or through a registered account. The counseling center server and the instant messaging server may be included in a counseling system for providing the counseling service, and a detailed configuration of the counseling system will be described in detail below.

The instant messaging server according to an example embodiment may provide various types of accounts, such as a personal account, a corporate account, or a service account, to use the instant messaging service. The personal account may be an account for general users, the corporate account may be an account for specific companies, and the service account may be an account for specific services. The corporate account or the service account may be referred to as a channel.

A counseling service according to an example embodiment may be provided in the form of counseling through a channel registered in the instant messaging service. The counseling through a channel may refer to the counseling conducted in a chatting manner between a channel and an account requesting the counseling for the channel. For example, the counseling service may be provided in a chatting manner using an instant messenger between a personal account (an account of a natural individual) of a first user corresponding to a general user and a channel of a second user corresponding to a specific company or a specific service provider. Hereinafter, the 'counseling center server' may be briefly referred to as a 'server'.

Operation 110 according to an example embodiment may include acquiring a search result of a chatbot server linked to a channel based on the search request for a message transmitted to the channel registered in the instant messaging service. The message transmitted to the channel may correspond to a message transmitted through a chat room for the counseling of the channel. The chat room for the counseling of the channel may include an account of a user who requested the counseling for the channel, and the message transmitted to the channel may correspond to a message transmitted from the account of the user participating in the chat room for the counseling of the channel.

According to an example embodiment, the first user may request the server for the counseling through the channel of the second user using the terminal. For example, the terminal of the first user may receive a command from the first user for requesting the counseling from a website or application linked to the channel of the second user and transmit, to the server, a signal for requesting the counseling through the channel of the second user. As another example, the terminal of the first user may respond to the input of the first user selecting (e.g., clicking) a button for a counseling request in an interface related to the channel of the second user provided in an instant messenger connected to the instant messaging server so as to transmit a signal for requesting the counseling through the channel of the second user to the server. In this case, the counseling request for the channel of the second user may be transmitted to the counseling center server through the instant messaging server.

According to an example embodiment, the first user may request the instant messaging server for the counseling through the channel of the second user using the terminal. As an example, the terminal of the first user may receive the command of the first user for requesting the counseling in a website or application linked to the channel of the second user, and transmit a signal for requesting the counseling through the channel of the second user to the instant messaging server. As another example, the terminal of the first user may respond to the input of the first user for selecting (e.g., clicking) a button for a counseling request in an interface related to the channel of the second user provided in the instant messenger connected to the instant messaging server and transmit a signal for requesting the counseling through the channel of the second user to the instant messaging server.

The instant messaging server according to an example embodiment may create a chat room for the counseling of the channel of the second user in response to an input requesting the counseling on the channel of the second user. A chat room for the counseling of a channel is a virtual chat space for conducting the counseling between a counselor linked to the channel and a user who requested the counseling. An account of the counselor linked to the channel and an account of the user who requested the counseling may conduct the counseling by transmitting and receiving messages through the chat room.

According to an example embodiment, the chat room created in response to an input requesting the counseling on a channel of a second user may include an account of a first user who requested the counseling. The instant messaging server may acquire account information of the first user who requested the counseling, based on the login information on the instant messaging service of a terminal that requested the counseling. When the terminal requesting the counseling is not logged in to the instant messaging service, the instant messaging server may request the terminal to log in to the instant messaging service.

According to an example embodiment, the server may receive a message transmitted from the instant messaging server through a chat room in the terminal logged in with the account of the first user. According to an example embodiment, the chat room creation and login request may be performed by the counseling center server.

According to an example embodiment, an account of a counselor linked to a channel may correspond to an account authorized to access a chat room for the counseling of the channel. The right to access the chat room of the channel may correspond to the right to transmit a message through the chat room of the channel using the channel and receive the message transmitted through the chat room of the channel.

According to an example embodiment, the right to access the chat room of the channel of the account of the counselor linked to the channel may be limited to a part of the chat room of the channel. For example, of chat rooms created for the counseling of the channel, an account of a first counselor may have access right for some parts allocated to the account of a first counselor, and an account of a second counselor may have access right for the other part allocated to the account of the second counselor.

The channel according to an example embodiment may be linked to a chatbot server. The chatbot server is a server that provides a chatbot service designed to have a conversation or counseling with a user. For example, a chatbot service, configured to extract an intent and an entity by parsing an input query and create a response corresponding to a query based on the extracted intent and entity, may be provided.

According to an example embodiment, the chatbot server, a search medium used to acquire a search result for a search request, may be used as a means for assisting a counselor using the counseling service to conduct the counseling. The account of the counselor linked to the channel may access the chat room for the counseling of the channel to receive a message transmitted to the chat room. The counselor may request the server for a search for the received message using the terminal logged in with the account of the counselor.

According to an example embodiment, a search request for a message transmitted to a chat room for the counseling of the channel may include a search request for a search word determined by the counselor to respond to a message, a search request for a keyword extracted from the message, and a search request for the entire message. For example, when a message transmitted to the chat room for the counseling of the channel is "Would you recommend some shoes for a 25-year-old woman?", the counselor received the message may request the server for a search using a search word such as 'shoe recommendation', and also request for a search using the entire message as a search word. When a search request using the entire message as a search word is received, the server may automatically extract a keyword and conduct a search on the extracted keyword.

Operation 110 according to an example embodiment may include transmitting a query corresponding to the search request to the chatbot server and acquiring a search result including a response corresponding to the query from the chatbot server. According to an example embodiment, the query corresponding to the search request may correspond to a command of which the search word corresponding to the search request is changed into a form for requesting a search medium for data. For example, when the search request is based on a specific keyword, the keyword or a value derived by converting the keyword into a parameter corresponding to a search medium may be transmitted as a query. Alternatively, when the search request is based on the entire message, keywords may be extracted from the message to transmit the extracted keyword as a query, or the entire message may be transmitted as a query.

According to an example embodiment, the chatbot server may output a response to an input query using various methods according to general operating principles of the chatbot server, such as rule-based, natural language processing-based, and learning-based, and combinations of various methods.

For example, the chatbot server may be linked to a database that stores a set of standardized questions and answers, and the chatbot server may create a response with reference to the linked database. The chatbot server linked to the database may flexibly process the input query to map to the standardized question stored in the database. More specifically, even if the input query is not literally identical to the standardized questions stored in the database, a question most similar to the input query among the standardized questions stored in the database may be searched. For example, the chatbot server may include a pre-trained artificial neural network-based model using a set of standardized questions and answers stored in a database as training data.

A search result including a response corresponding to a query created by the chatbot server according to an example embodiment may include at least one parameter. The parameter may include a variable required to perform an operation corresponding to the intent analyzed in the query. The operation corresponding to the intent analyzed in the query may include an operation of creating a response message suitable for the intent. For example, in the case of a search request related to 'recommendation', the search result corresponding to the search request may include a product name of the recommended product required for creating a response message related to 'recommendation' as well as parameters of the age and gender of a user who requested the recommendation. The search result of the chatbot server may further include a function for performing an operation corresponding to the intent analyzed in the query, based on the value of the parameter. When the value of the parameter included in the search result of the chatbot server is determined, an operation corresponding to the value of the parameter determined according to the function included in the search result of the chatbot server may be performed.

According to an example embodiment, the parameter included in the search result of the chatbot server may be mapped to a predetermined entity. A plug-in, a program provided by the chatbot server as an auxiliary input means for a value of a parameter, may include, for example, a barcode transmission plug-in that supports a barcode recognition function and a date/time plug-in that supports a date/time input using a picker. According to an example embodiment, a parameter mapped to a plug-in may have data received based on the plug-in as a value of parameter. An operation of transmitting the plug-in to acquire a value of a parameter mapped to the plug-in will be described in detail below.

According to an example embodiment, an entity, a data dictionary in which terms that the chatbot server is able to understand are systematically organized, may include an entity identifier and at least one entry corresponding to the entity identifier. The entity identifier may be specified in a predetermined format. For example, an entity related to a cafe menu may include '@_cafe_menu' as an entity identifier, and may include 'Americano', 'cafe latte', and 'cafe mocha' as entries. The chatbot server may use the entity registered in the chatbot server to analyze the intent of the received message and create a response to the message.

According to an example embodiment, the parameter mapped to the entity may have an entry corresponding to the entity as a value of the parameter. For example, when the parameter of an 'ordered product' is mapped to the entity related to the cafe menu, the parameter of the 'ordered product' may have the value of the parameter of 'Americano', 'cafe latte', or 'cafe mocha' which are entries corresponding to the entity related to the cafe menu.

According to an example embodiment, the entity may include a general-purpose entity and a customized entity. The general-purpose entity, an entity predefined for generally, commonly used concepts such as date, time, and place name, may correspond to an entity registered as a default in a chatbot server. The customized entity may correspond to an entity defined by a user and registered in a chatbot server.

A parameter included in the search result of the chatbot server according to an example embodiment may be mapped to an entity registered in the chatbot server and classified into different types depending on whether the mapped entity is the general-purpose entity or the customized entity. For example, a parameter mapped to the general-purpose entity may correspond to a first type, and a parameter mapped to the customized entity may correspond to a second type. As described above, a parameter included in the search result of the chatbot server may be mapped to a plug-in, and the parameter mapped to the plug-in may correspond to a third type.

Operation 120 according to an example embodiment may correspond to providing an interface for inputting a value of at least one parameter included in the search result to a terminal of a counselor linked to the channel. Hereinafter, an 'interface for inputting a value of at least one parameter included in the search result' may be referred to as an 'interface for inputting a parameter'. The interface for parameter input may include an interfacing object supporting an input function of data corresponding to the parameter.

For example, the interface for parameter input may include an input window corresponding to a parameter included in the search result. The counselor may input data corresponding to the parameter into an input window included in the interface for parameter input using the terminal, and the terminal of the counselor may transmit data input in correspondence with the parameter to the server.

As another example, the interface for parameter input may include an interfacing object for requesting transmission of a plug-in corresponding to a parameter included in the search result (hereinafter, referred to as an interfacing object for plug-in transmission request). The counselor may select (e.g., click) an interfacing object for the plug-in transmission request included in the interface for parameter input using the terminal, and the terminal of the counselor may respond to the input of the counselor selecting the interfacing object for the plug-in transmission request so as to transmit a signal for requesting transmission of the plug-in to the server. The server may call the plug-in mapped to the parameter and transmit, through the chat room, the plug-in to the terminal logged in with the account of a user participating in the chat room. According to an example embodiment, the transmission of the plug-in may be performed in the chatbot server. The user may input data corresponding to the parameter using the plug-in, and the terminal of the user may transmit the input data corresponding to the parameter to the server.

According to an example embodiment, the interface for parameter input may include an interfacing object supporting different input methods depending on types of parameters. As an example, operation 120 of providing the interface may include at least one of providing an interface including a first input window for inputting a value of a first type parameter mapped with a predefined general-purpose entity, providing an interface including a second input window for inputting a value of a second type parameter mapped with a customized entity, and providing an interface including a plug-in transmission function for inputting a value of a third type parameter mapped with a predefined plug-in. The first input window and the second input window may correspond to interfacing objects having each different input method and/or type of input data. The plug-in transmission function may be implemented as an interfacing object for requesting plug-in transmission. A specific example of an interface for parameter input according to an example embodiment will be described in detail below.

Operation 130 according to an example embodiment may correspond to acquiring an entity corresponding to at least one parameter included in the search result of the chatbot server based on the message transmitted to the channel.

Operation 130 according to an example embodiment may include acquiring, from the chatbot server, a predetermined entity extracted based on a query corresponding to the message, determining a value of a first parameter mapped to the acquired entity among parameters included in the search result as a value of the acquired entity, and displaying the value of the first parameter as the value of the acquired entity on the interface.

As described above, the counseling center server may transmit the entire message to the chatbot server as a query based on the search request for the message. The chatbot server may parse the message to extract text corresponding to the entity registered in the chatbot server. For example, when the message includes the text 'a' corresponding to the entry of a first entity, the chatbot server may extract the first entity as an entity corresponding to the text 'a'. The server may receive information on the entity extracted from the message from the chatbot server. For example, the server may receive, from the chatbot server, information that 'a' included in the message corresponds to the first entity.

As described above, the parameter included in the search result may be mapped to a predetermined entity. The server may determine the value of the parameter mapped to the entity included in the message among parameters included in the search result as a value of an entity included in the message. For example, when 'a', which is the first entity, is included in the message, the value of the first parameter mapped to the first entity may be determined as 'a'.

According to an example embodiment, when the value of the parameter included in the search result is determined, the server may display the value of the parameter on an interface for parameter input provided to the terminal of a counselor. For example, when the value of the first parameter is determined as 'a', 'a' may be displayed on an interface for parameter input provided to the terminal of a counselor in correspondence with the first parameter.

According to an example embodiment, information on the entity extracted from the message may be included in the search result of the chatbot server. When the chatbot server receives the entire message as a query, the value of the parameter mapped to the entity extracted from the message among parameters included in the search result may be determined as the value of the entity included in the message, and the search result including the parameter with the value determined may be transmitted to the server. In other words, the search result acquired in operation 110 may include parameters whose values are already determined.

Operation 140 according to an example embodiment may correspond to determining at least one value of parameters included in the search result based on at least one of the entity acquired in operation 130 and data input through the interface for parameter input provided in operation 120.

As described above, the values of some parameters included in the search result may be determined based on the entity extracted from the message. A value of a parameter that is not mapped to an entity extracted from the message may be determined based on data input through an interface for parameter input. The counselor may input data corresponding to the parameter through the interface for parameter input, and the terminal of the counselor may transmit the input data to the server. According to an example embodiment, the interface for parameter input may provide an item of entity(s) corresponding to an entity mapped to a specific parameter, and a counselor may input the value of the parameter by selecting the provided item of entities. The server may determine a value of the parameter based on data corresponding to the received parameter. In other words, operation 140 of determining the value of the parameter may include determining the value of a second parameter that is not mapped to the acquired entity among parameters included in the search result based on data input through the interface. Meanwhile, as described above, of parameters included in the search result, the value of the first parameter extracted from the message and mapped to the acquired entity may be determined as the value of the entity included in the message through operation 130.

According to an example embodiment, a value of a parameter predetermined based on an entity extracted from a message may be changed based on data input through an interface for parameter input. The counselor may input data corresponding to the parameter whose value is predetermined through the interface for parameter input, and the terminal of the counselor may transmit the input data to the server. Based on data corresponding to the received parameter, the server may change the value of the parameter according to the input of the counselor. In other words, operation 140 of determining the value of the parameter may include changing the value of the first parameter determined as the value of the acquired entity based on data input through the interface.

According to an example embodiment, operation 140 may include judging, based on the entity mapped to the parameter, the validity of the data input in correspondence with the parameter, and determining the value of the parameter as the input data based on the judged validity. The operation of determining the validity of the input data may include an operation of determining, by checking whether the data input directly from the server or through the chatbot server corresponds to an entry of an entity mapped to the parameter, to be valid when it is checked that the input data corresponds to the entry of the entity mapped to the parameter or to be invalid when it is not. For example, by acquiring the result of determination whether the data input from the chatbot server corresponds to the entry of the entity mapped to the parameter, the server may identify whether the input data corresponds to the entry of the entity mapped to the parameter. As another example, the server may determine whether the input data corresponds to the entry of the entity mapped to the parameter by determining whether the directly input data corresponds to the entry of the entity mapped to the parameter. In other words, operation 140 of determining the value of the parameter includes receiving an input of data corresponding to the parameter through the interface, checking whether the input data corresponds to an entity mapped to the parameter, and determining the value of the parameter as the input data based on the check result. As a result of the determination, when the input data corresponds to the entity mapped to the parameter, the value of the parameter may be determined as the input data. When the input data does not correspond to the entity mapped to the parameter, the value of the parameter may not be determined as the input data.

Operation 140 of determining the value of the parameter according to an example embodiment may include determining the value of the third type parameter mapped to the plug-in among parameters included in the search result as data received based on the plug-in. As described above, data received based on the plug-in may correspond to data input by a user participating in a chat room, not data input by a counselor. The value of the parameter determined based on the data received based on the plug-in may be set not to be changed by the counselor.

According to an example embodiment, operation 150 according to an example embodiment may include creating a response message corresponding to the search result based on the value of the parameter determined in operation 140, and requesting the instant messaging server to transmit the response message through the chat room.

The response message, a message whose value of a parameter included in the search result is converted in a form of message that is recognizable by a user, may include, for example, a text message, a multimedia message, and a voice message. According to an example embodiment, the response message may be created based on a message template predetermined in correspondence with the search result. For example, by inputting the determined value of the parameter into an item corresponding to the parameter of the message template, a response message corresponding to the search result may be created.

According to an example embodiment, the response message may include content created based on at least one of a value of a first type parameter and a value of a second type parameter among parameters included in the search result. The content included in the response message may include content for delivering information such as text, images, videos, and links corresponding to a value of a parameter mapped to an entity.

According to an example embodiment, the response message may include at least one of the plug-ins for requesting data input to a user called based on the value of the third type parameter among the parameters included in the search result. As an example, the response message may include a plug-in that assists data input of the user such as a barcode plug-in and a date/time plug-in called based on the value of the third type parameter mapped to the plug-in.

According to an example embodiment, the response message may be created when values of all essential parameters included in the search result are determined. The essential parameter is a parameter essentially required for creation of a response message, and whether a parameter included in the search result is the essential parameter may be determined according to a predetermined criterion in the chatbot server.

According to an example embodiment, the server may provide a screen for previewing the created response message through an interface provided to the terminal of the counselor. The screen for previewing the response message may correspond to a screen exemplarily showing the response message displayed on the chat window when the response message is transmitted through the chat room.

Operation 150 of requesting transmission of a response message according to an example embodiment may include activating a transmission request function of a response message corresponding to the search result in response to determining values of at least a part of parameters included in the search result and requesting the instant messaging server to transmit the response message in response to the transmission request of the response message received through the interface. For example, when values of all parameters included in the search result are determined or when values of all essential parameters included in the search result are determined, the server may activate a transmission request function of the response message.

For example, a function of requesting transmission of a response message may be implemented as an interfacing object included in an interface for parameter input. The interfacing object, a configuration implemented to interact with a user within an interface, may include, for example, an object that may receive input from a user while providing specific information (e.g., visual information) to the user. The interfacing object may include a button configured to make a predetermined function performed by the selection input (e.g., click) of the user (e.g., switching to another screen).

According to an example embodiment, the interface for parameter input provided to the terminal of a counselor may include an interfacing object for requesting transmission of a response message, and the terminal of the counselor may request the server to transmit the response message by the input of the counselor selecting the interfacing object. The interfacing object for requesting transmission of a response message may be activated in response to a state in which values of all parameters included in the search result are determined or values of all essential parameters are determined.

According to an example embodiment, the server may request the instant messaging server to transmit a response message, and the instant messaging server received the request may transmit the response message to the account of the user participating in the chat room through the chat room for the counseling of the channel. When the response message is transmitted from the server through the instant messaging server, a sender of the response message may correspond to an account of a counselor.

According to an example embodiment, operation 150 of requesting transmission of the response message may include requesting the chatbot server to transmit a response message corresponding to the search result, based on the determined value of a parameter. A response message corresponding to the search result may be created in the chatbot server and transmitted through a chat room for the counseling of the channel. The server may transmit information required for creating a response message corresponding to the search result to the chatbot server. Information required for creating a response message may include a value of a parameter included in the search result of the chatbot server. The chatbot server may create a response message based on the information for creating a response message received from the server, and may request the instant messaging server to transmit the created response message. The instant messaging server may transmit the transmission-requested response message through a chat room for the counseling of the channel. In this case, a sender of the response message may correspond to a chatbot.

According to an example embodiment, the server may deliver, to the chatbot server, data corresponding to the parameter received according to operation 140 as information required for creating the response message. The chatbot server may determine the value of the parameter based on data corresponding to the received parameter. In other words, an operation of determining the value of the parameter based on data corresponding to the parameter may be performed in the chatbot server. The chatbot server may create a response message based on the determined value of the parameter and may request the instant messaging server to transmit the created response message.

According to an example embodiment, operation 110 may include creating a counseling center module corresponding to the channel in response to a request for opening the counseling center of the channel registered in the instant messaging service, linking a chatbot server linked to the channel to the counseling center module, receiving a search request for a message transmitted through a chat room of the channel included in the counseling center module, and acquiring a search result corresponding to the search request received from the chatbot server linked to the counseling center module.

The counseling center module, an instance created in correspondence with a channel in the server, may include data for providing and managing the counseling service for the channel. For example, the counseling center module may include data for providing counseling services such as account(s) of the counselor(s) linked to the corresponding channel, chat room(s) created for the counseling of the channel, counseling history, and counseling performance results. The counseling center module may correspond to an instance having a 1:1 corresponding relation with a channel, and the counseling center module corresponding to a specific channel may not correspond to another channel. The server may create and/or delete the counseling center module by the request of the channel. A channel in which the counseling center module is created may use the counseling service function provided in the server.

The request for opening the counseling center according to an example embodiment is to request the creation of a counseling center module corresponding to a specific channel registered in a server and may be received from a terminal logged in with an account of a manager of the channel or a terminal logged in with an account of a user authorized to manage the counseling center of the channel. Hereinafter, an 'account of a manager of a channel' or an 'account of a user authorized to manage a counseling center of a channel' is referred to as an 'account of a manager of a counseling center'.

According to an example embodiment, when there is a chatbot server linked to a channel in which the counseling center module is created, the server may link the chatbot server with the counseling center module. As described above, the chatbot server may be used as a means for assisting a counselor using the counseling service to conduct the counseling.

According to an example embodiment, when the counseling center module corresponding to a channel is created, an account of a counseling center manager may register an account of a counselor linked to the channel in the counseling center module. An interface related to the counseling center module may be provided to a terminal logged in with the account of the counselor registered in the counseling center module. The counselor may conduct the counseling with a user account requesting the counseling by accessing the chat room created for the counseling through an interface related to the counseling center module provided in a terminal and transmitting and receiving messages, and may use functions related to counseling services, such as use of a search function to create messages for counseling.

According to an example embodiment, the terminal of the account of the counselor registered in the counseling center module may request the server for a search based on the message transmitted to the chat room of the channel. The server may transmit a query corresponding to the received search request to the chatbot server to acquire a search result from the chatbot server, and deliver the acquired search result to the counselor through the interface related to the counseling center module provided in the terminal of the counselor. An interface related to a counseling center module according to an example embodiment will be described in detail below.

Figure 2:
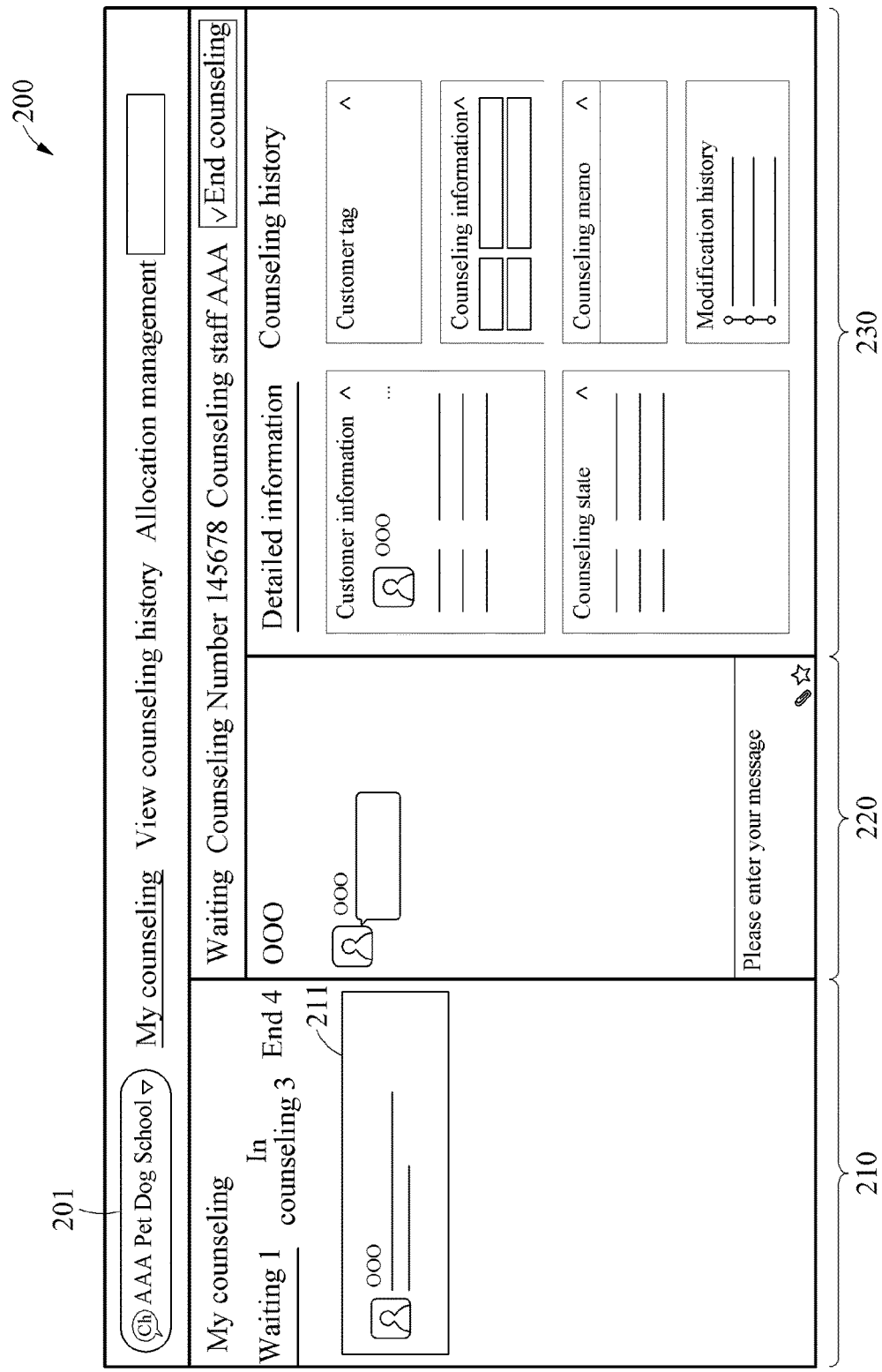
FIG. 2 is a diagram illustrating a screen of an interface related to a counseling center module according to an example embodiment.

FIG. 2 is a diagram illustrating a screen of an interface related to a counseling center module according to an example embodiment.

Referring to FIG. 2, an interface 200 related to the counseling center module corresponding to a specific channel 201 according to an example embodiment may be provided to a terminal (hereinafter, referred to as a terminal of a counselor) logged in with an account of a counselor linked to the channel. The interface 200 provided to the terminal of the counselor may include a chat room list 210 allocated to the account of the counselor. By selecting (e.g., clicking) the interfacing object 211 related to the chat room displayed in the chat room list, the counselor may request the server to access the chat room. For example, when the counselor requests the server to access the chat room by clicking the interfacing object 211 related to the chat room, the server may respond to the access request and provide a chat window 220 corresponding to the chat room to the terminal of the counselor. The terminal of the counselor may request, in response to a message input by the counselor in the chat window 220, the server to transmit a message to the account of the user participating in the chat room. The counselor may conduct the counseling with the user by transmitting and receiving a message to and from the account of the user participating in the chat room through the chat window 220.

According to an example embodiment, the chatting interface 200 may further include a window 230 for providing information on the counseling in addition to the chat room list 210 and the chat window 220. The information on the counseling may include, for example, information on a user who requested the counseling, information on the status of the counseling, and information on the duration of the counseling.

Figure 3A:
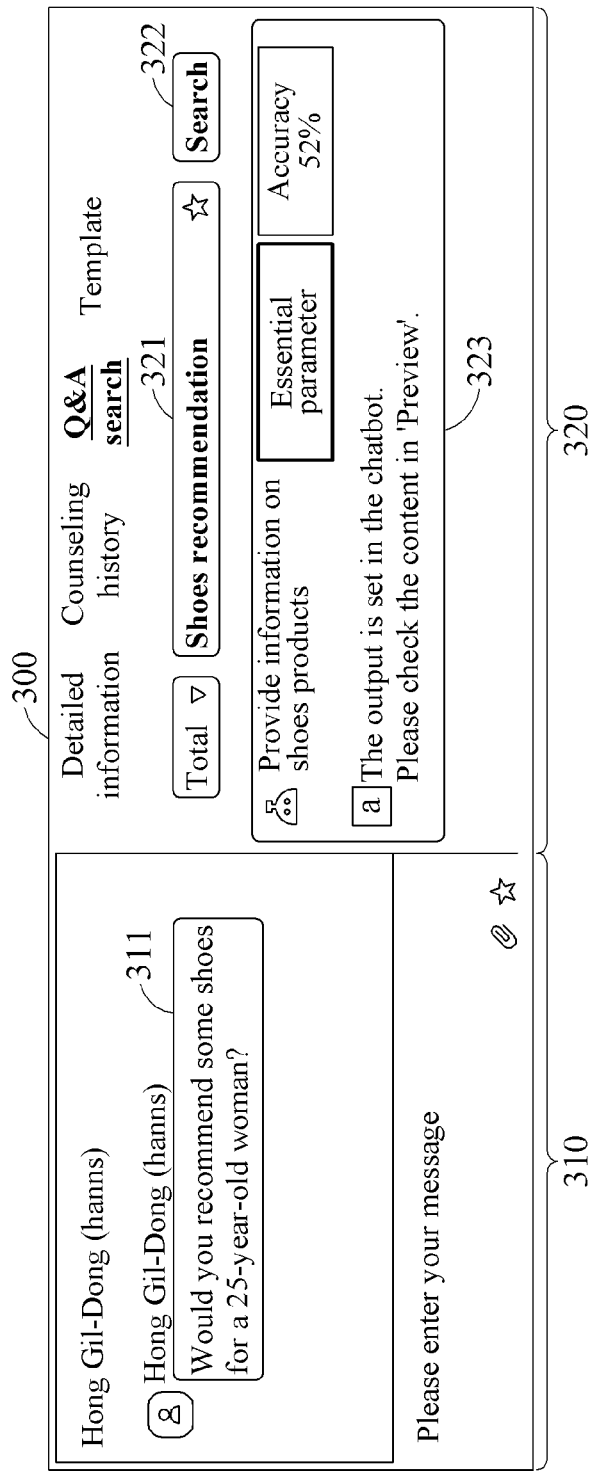
FIGS. 3A and 3B are diagrams illustrating a screen of an interface related to a counseling center module supporting a search function according to an example embodiment.
Figure 3B:
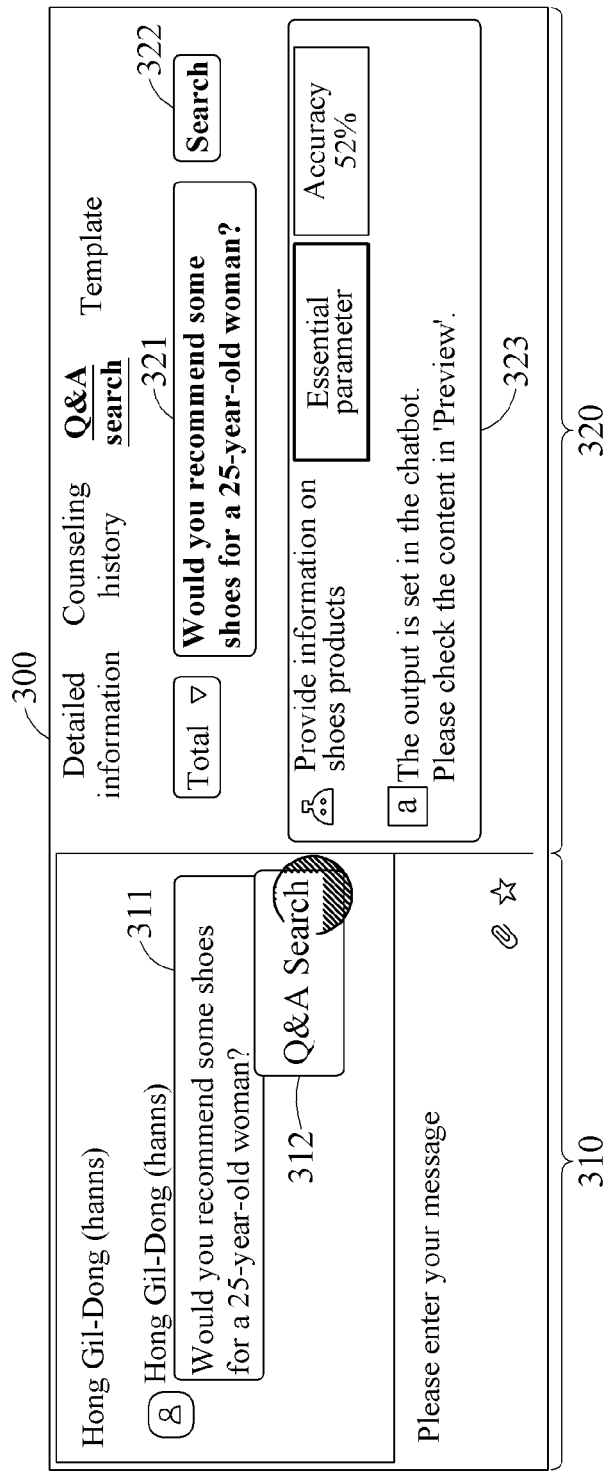

FIGS. 3A and 3B are diagrams illustrating a screen of an interface related to a counseling center module supporting a search function according to an example embodiment.

As described above, the counselor linked to a specific channel may access the chat room of the channel created for the counseling through the interface related to the counseling center module provided in the terminal to conduct the counseling in a chatting manner with the account of a user who requested the counseling and use a search function to create a message for the counseling.

Referring to FIGS. 3A and 3B, the interface 300 related to the counseling center module provided to the terminal of the counselor may transmit a search request to the chat window 310 corresponding to the chat room and the server, and may include a search interface 320 for a search function to receive the search result. A message 311 transmitted to the chat room for counseling may be displayed through the chat window 310, and the counselor may request the server to search for a specific search word based on the message 311 through the search window 321 included in the search interface 320.

For example, referring to FIG. 3A, based on a message 311 (e.g., "Would you recommend some shoes for a 25-year-old woman?") received through a chat room to request the counseling related to shoe recommendations, the counselor may input a search word (e.g., "shoe recommendation") directly into the search window 321. For another example, referring to FIG. 3B, the chat window 310 may provide a function of transmitting, to the server, a search request for the entire message by an input (e.g., click) for selecting the interfacing object 312 requesting a search for the message 311. In response to the input of the counselor selecting the 'search' button 322, the terminal of the counselor may transmit a signal requesting a search for the input search word to the server.

As described above, the server receiving the search request may transmit a query corresponding to the search request to the chatbot server linked to the counseling center module and acquire a search result 323 corresponding to the search request based on the response to the query received from the chatbot server. In response to an input for selecting the search result 323 of the chatbot server, an interface for parameter input may be provided to the terminal of the counselor.

FIGS. 4A and 4B are diagrams illustrating an example of an interface for parameter input according to an example embodiment.

Referring to FIG. 4A, in response to an input for selecting the search result of the chatbot server, an interface 400 for inputting data corresponding to a parameter included in the search result may be provided to the terminal of the counselor. The parameter included in the search result may include parameters related to 'shoe model', parameters related to 'gender', parameters related to 'age', and parameters related to 'date of reception'.

As described above, the interface for parameter input may include input windows 410, 420, and 430 corresponding to each parameter included in the search result and/or an interfacing object 440 for requesting plug-in transmission. The counselor may input data corresponding to the parameter into an input window included in the interface for parameter input by using the terminal, and the terminal of the counselor may transmit the input data corresponding to the parameter to the server. Alternatively, the counselor may select (e.g., click) the interfacing object 440 for the plug-in transmission request included in the interface for parameter input using the terminal, and the terminal of the counselor may transmit a signal requesting transmission of the plug-in to the server, in response to the input of the counselor selecting the interfacing object for the plug-in transmission request. The server may call the plug-in mapped to the parameter and transmit the plug-in to the terminal logged in with the account of the user who requested the counseling through the chat room.

Referring to FIG. 4B, an interface for parameter input according to an example embodiment may include an input window for a parameter in which values of some parameters are shown as values of entities acquired from messages.

For example, when a search-requested message is "Would you recommend some shoes for a 25-year-old woman?", the chatbot server may extract, from the message, an entity of 'age' as an entity corresponding to '25-year-old' and an entity of 'gender' as an entity corresponding to 'woman'. The chatbot server may transmit the entity extracted from the message to the server, and the server may display, in the input windows 420 and 430 included in the interface 400 for parameter input, a value of a parameter related to 'gender' corresponding to the entity extracted from the message as 'woman' which is a value of the entity for 'gender' mapped to the parameter and a value of a parameter related to 'age' as '25-year-old' which is a value of the entity for 'age' mapped to the parameter.

As described above, the counselor may input data corresponding to the first parameter displayed as the value of the pre-acquired entity by using the terminal, and the server may change the value of the first parameter determined as the value of the acquired entity based on the input data through the interface. For example, when the counselor inputs 'mid 20's' as data corresponding to the value of the parameter for 'age' through the interface for parameter input, the server may change the value of the parameter for 'age' from '30-year-old' to 'mid 20's'.

According to an example embodiment, validity of data input in correspondence with a parameter may be determined based on an entity mapped to the parameter. The server may determine whether the input data is valid by checking whether the data input in correspondence with the parameter directly or through the chatbot server corresponds to an entry of an entity mapped to the parameter. When it is determined that the input data is valid, the input data may be determined as a value of the parameter, and an interfacing object 450 indicating a valid input may be added to an interface for parameter input.

FIG. 5 is a diagram illustrating an example of an interfacing object according to a parameter type included in an interface for parameter input according to an example embodiment.

According to an example embodiment, the interface for parameter input may include an interfacing object supporting different input methods depending on types of parameters. For example, the interface for parameter input may include a first input window 510 corresponding to a first type parameter, a second input window 520 corresponding to a second type parameter, and an interfacing object 530 for requesting plug-in transmission corresponding to a third type parameter.

According to an example embodiment, the first input window 510 may correspond to a text input window into which text may be input. The first input window 510 may display an example of a value of a parameter which may be input, and the displayed example may correspond to at least a part of entries corresponding to an entity mapped to the parameter. For example, a parameter related to 'age' may be mapped to an entity of 'age', and the entity of 'age' may include entries of '20-year-old', '30-years-old', and 'twenty years old'. In the first input window 510 corresponding to the parameter related to 'age', '20-year-old' and 'twenty years old', which are entries of the entity of 'age' mapped as examples of values of parameters which may be input, may be displayed.

According to an example embodiment, the second input window 520 may correspond to a drop-down list input window enabling input of any one of items included in the drop-down list by searching and/or selecting an item included in the drop-down list. The drop-down list may include entities corresponding to entities mapped to parameters as selectable items. For example, a parameter related to 'shoe model' may be mapped to an entity of 'product name', and the entity of 'product name' may include entries of 'XX 327', 'AABB', 'CCC', and 'AS-01'. The second input window 520 corresponding to the parameter related to 'shoe model' may include 'XX 327', 'AABB', 'CCC', and 'AS-01' which are entries of entities of 'product name' mapped to the drop-down list as selectable items.

According to an example embodiment, the interfacing object 530 for requesting plug-in transmission may correspond to an interfacing object that receives a selection input and transmits a plug-in transmission request to the server.

Figure 6:
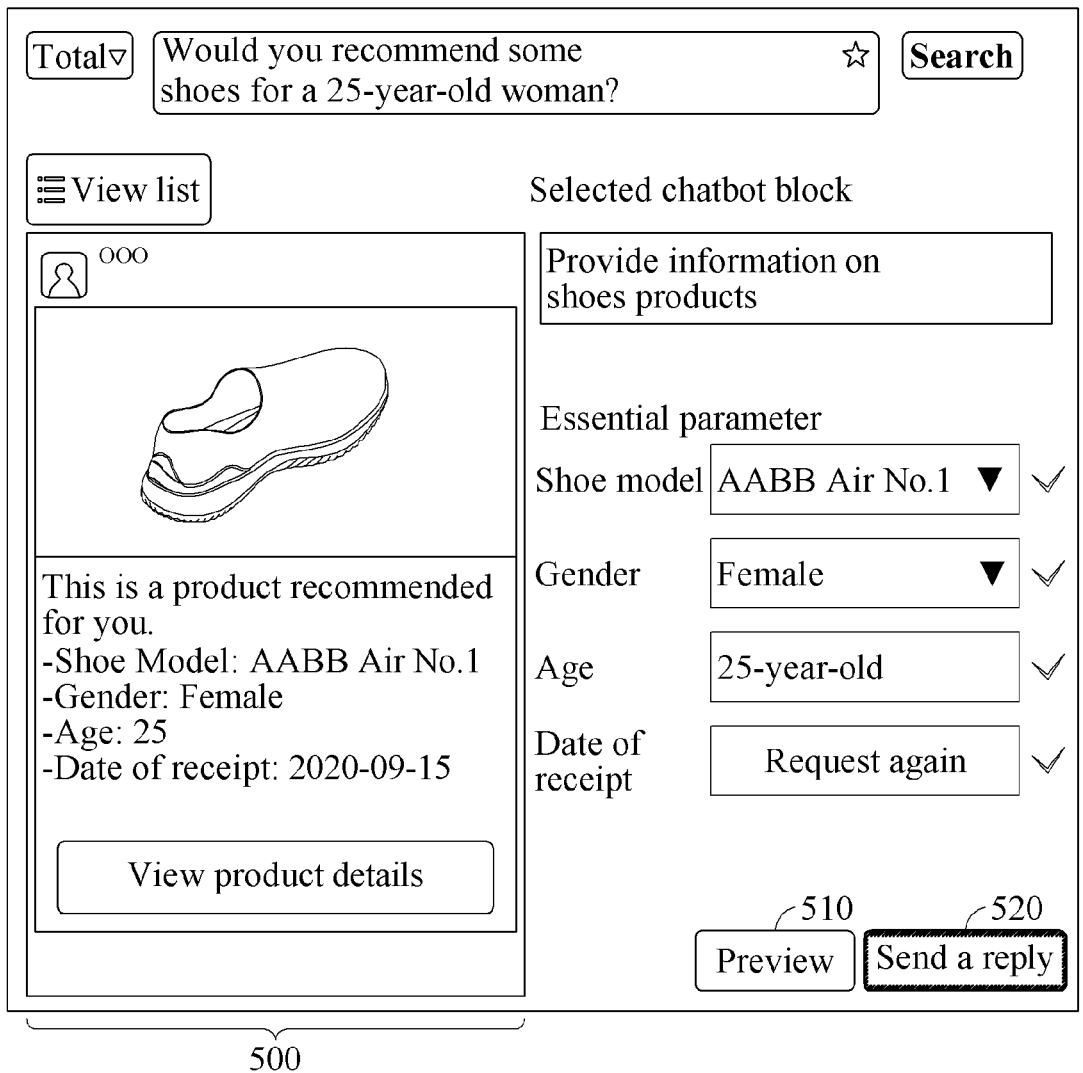
FIG. 6 is a diagram illustrating a preview function and a transmission request function of a response message corresponding to a search result according to an example embodiment.

FIG. 6 is a diagram illustrating a preview function and a transmission request function of a response message corresponding to a search result according to an example embodiment.

Referring to FIG. 6, a response message corresponding to the search result may be created based on the determined value of the parameter included in the search result. For example, the response message may be created when values of all essential parameters included in the search result are determined. The server may provide a screen 600 for previewing the created response message through an interface provided to the terminal of the counselor. The preview screen for the response message may be provided in response to a selection input of the interfacing object 610 for a preview request of the response message, and the interfacing object 610 for a preview request may be activated when values of all essential parameters included in the search result are determined.

According to an example embodiment, the created response message may be transmitted through a chat room in response to a selection input of the interfacing object 620 for transmission request of the response message. The interfacing object 620 for transmission request of the response message may be activated when values of all essential parameters included in the search result are determined.

Figure 7:
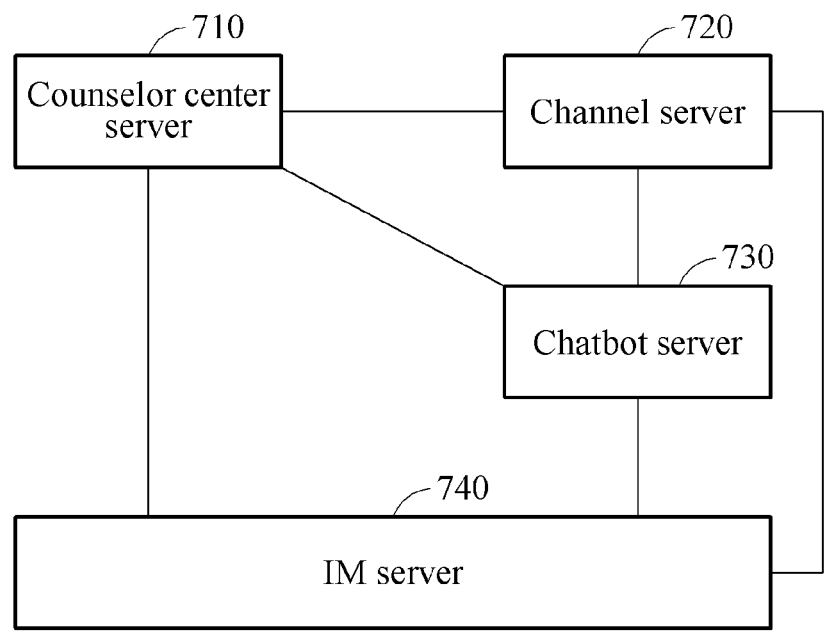
FIG. 7 is an exemplary diagram illustrating a configuration of a counseling system according to an example embodiment.

FIG. 7 is an exemplary diagram illustrating a configuration of a counseling system according to an example embodiment.

Referring to FIG. 7, the counseling system according to an example embodiment may include a counseling center server 710, a channel server 720, a chatbot server 730, and an instant messaging server 740 (hereinafter referred to as an IM server).

The counseling system may perform an operation related to the counseling service conducted in a chatting manner between a personal account of a first user corresponding to a general user and a channel of a second user corresponding to a specific company or a specific service provider. The counselor linked to the channel of the second user may communicate with the counseling center server 710 through the counseling center app installed in the terminal of the counselor or the counseling center web connected from the terminal of the counselor, access the chat room of the channel of the second user, and transmit and receive messages through the chat room. The first user may communicate with the IM server 740 through the instant messaging app installed in the terminal of the first user or the instant messaging web connected from the terminal, access the chat room of the channel of the second user, and transmit and receive messages through the chat room.

According to an example embodiment, the terminal of the first user accessing the chat room of the channel of the second user may transmit a message to the chatbot or may transmit a message to a counselor linked to the channel of the second user. A recipient of the message may be determined depending on the type of counseling conducted in the chat room. For example, when the counseling type conducted in the chat room of the channel of the second user is the first counseling type corresponding to the unmanned counseling, a recipient of the message may be determined to be a chatbot linked to the channel of the second user. When the counseling type conducted in the chat room of the channel of the second user is the second counseling type corresponding to the manned counseling, a recipient of the message may be determined to be a counselor linked to the channel of the second user.

According to an example embodiment, the message transmitted from the terminal of the first user through the chat room of the channel may be transmitted to the IM server 740, and the IM server 740 may transmit the message to the counseling center server 710 or the chatbot server 730. For example, the IM server 740 may transmit the message to the counseling center server 710 when the message is transmitted to the counselor, and transmit the message to the chatbot server 730 when the message is transmitted to the chatbot. The message transmitted to the chatbot server 730 may be transmitted from the chatbot server 730 to the counseling center server 710. The chatbot server 730 may create a response message to the message, and transmit the created response message to the terminal of the user through the IM server 740.

According to an example embodiment, a message transmitted from the terminal of the first user through the chat room of the channel may be transmitted to the IM server 740, the IM server 740 may transmit the message to the channel server 720, and the channel server 720 may transmit the message to the counseling center server 710 or the chatbot server 730. The channel server 720 may process branching of a path through which the message is transmitted, and when the message is transmitted to the counselor, the message may be transmitted to the counseling center server 710. When the message is transmitted to the chatbot, the message may be transmitted to the chatbot server 730.

According to an example embodiment, when the counseling ticket corresponding to the chat room of the channel to which the message is transmitted is not created, the counseling center server 710 may create a counseling ticket corresponding to the chat room. As described above, the type of the counseling ticket may be determined based on the type of counseling conducted in the chat room to which the message is transmitted. For example, when the counseling type at the time the message is transmitted is the first counseling type corresponding to the unmanned counseling, the first type of counseling ticket may be created. When the counseling type at the time the message is transmitted corresponds to the second counseling type corresponding to the manned counseling, a second type of counseling ticket may be created. According to an example embodiment, while the chatbot server 730 transmits the message to the counseling center server 710, it is possible to request the counseling center server 710 to create the counseling ticket. The counseling center server 710 receiving the request for creating the counseling ticket from the chatbot server 730 may create a first type of counseling ticket.

The counseling center server 710 may allocate the second type of counseling ticket created in correspondence with the chat room of the channel of the second user to any one of accounts of a counselor linked to the channel of the second user. The counseling center server 710 may transmit a message received through the chat room corresponding to the second type of counseling ticket to a terminal of a counselor to which the counseling ticket is allocated. The terminal of a counselor may request transmission of a message through the chat room corresponding to the counseling ticket allocated to the counseling center server 710, and the counseling center server 710 may transmit the message to the terminal of a user connected to the chat room through the IM server 740.

According to an example embodiment, the counseling center server may correspond to an electronic device including a processor, a memory, and an input/output device.

The processor of the counseling center server according to an example embodiment may perform at least one operation described above with reference to FIG. 1. For example, the processor may perform operations of the counseling center server interworking with the instant messaging service described above with reference to FIG. 1. In addition, the interface described above with reference to FIGS. 2 to 6 may be provided to the terminal of the counselor.

The memory of the counseling center server according to an example embodiment may be a computer-readable recording medium which may be a volatile memory or a non-volatile memory. The memory according to an example embodiment may store information on the provision of the counseling service described above with reference to FIG. 1. For example, the memory of the server may store accounts of users registered in the server, and may store a counseling center module created to correspond to a channel registered in the server.

According to an example embodiment, the memory of the counseling center server may store a program in which at least one operation described above with reference to FIG. 1 is executed. The processor of the counseling center server may execute a program stored in the memory and control the server. The code of the program executed by the processor of the counseling center server may be stored in the memory.

The example embodiments described herein may be implemented using hardware components, software components, or a combination thereof. For example, the apparatus, method, and components described in the example embodiments may be implemented using a general purpose computer or special purpose computer, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may run an operating system (OS) and one or more software applications that run on the OS. The processing device also may access, store, manipulate, process, and create data in response to execution of the software. For purpose of simplicity, the description of a processing device is used as singular, however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the example embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter.

The described hardware devices may be configured to act as one or more software modules in order to perform the operations of the above-described example embodiments, or vice versa.

While this disclosure includes example embodiments, it will be apparent to one of ordinary skill in the art that various changes in form and details may be made in these example embodiments without departing from the spirit and scope of the claims and their equivalents. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of operating a counseling center server interworking with an instant messaging service, the method comprising:
   acquiring, based on a search request for a message transmitted to a channel registered in the service, a search result of a chatbot server linked to the channel;
   providing an interface for inputting a value of at least one parameter included in the search result to a terminal of a counselor linked to the channel;
   acquiring an entity corresponding to the parameter based on the message;
   determining a value of the parameter included in the search result based on at least one of the entity acquired based on the message and data input through the interface; and
   requesting, based on the determined value of the parameter, an instant messaging server configured to provide the service to transmit a response message corresponding to the search result,
   wherein the entity is a term registered as a general term for the parameter in the chatbot server,
   wherein the determining of the value of the parameter comprises:
   checking whether the data input through the interface corresponds to an entity mapped to the parameter; and
   determining, based on the check result, the value of the parameter as the data input through the interface.

2. The method of claim 1, wherein the acquiring of the entity comprises:
   acquiring, from the chatbot server, a predetermined entity extracted based on a query corresponding to the message;
   determining a value of a first parameter mapped to the acquired entity among parameters included in the search result as a value of the acquired entity; and
   displaying the value of the first parameter as the value of the acquired entity on the interface.

3. The method of claim 2, wherein the determining of the value of the parameter comprises determining a value of a second parameter not mapped to the acquired entity among the parameters included in the search result based on the data input through the interface.

4. The method of claim 2, wherein the determining of the value of the parameter comprises changing the value of the first parameter determined as the value of the acquired entity based on the data input through the interface.

5. The method of claim 1, wherein the requesting to transmit the response message comprises:
   creating the response message including content created based on the determined value of the parameter; and
   requesting the instant messaging server to transmit the response message through a chat room.

6. The method of claim 1, wherein the requesting to transmit the response message comprises:
   activating a transmission request function of the response message in response to determining values of at least a part of parameters included in the search result; and
   requesting the instant messaging server to transmit the response message in response to the request to transmit the response message received through the interface.

7. The method of claim 1, wherein the requesting to transmit the response message comprises requesting the chatbot server to transmit a response message corresponding to the search result based on the determined value of the parameter, and
   the chatbot server is configured to create the response message based on the determined value of the parameter and request the instant messaging server to transmit the created response message.

8. The method of claim 1, wherein the acquiring of the search result comprises:
   transmitting a query corresponding to the search request to the chatbot server; and
   acquiring a search result including a response corresponding to the query from the chatbot server.

9. The method of claim 1, wherein the providing of the interface comprises at least one of:
   providing the interface comprising a first input window for inputting a value of a first type parameter mapped with a predefined general-purpose entity;
   providing the interface comprising a second input window for inputting a value of a second type parameter mapped with a customized entity; and
   providing the interface comprising a plug-in transmission function for inputting a value of a third type parameter mapped with a predefined plug-in.

10. The method of claim 9, wherein the determining of the value of the parameter comprises determining the value of the third type parameter among parameters included in the search result as data received based on the plug-in.

11. The method of claim 1, wherein the entity comprises at least one of a general-purpose entity and a customized entity registered in the chatbot server.

12. A computer program stored in a non-transitory computer-readable medium in combination with hardware to execute the method of claim 1.

13. A method of operating a counseling center server interworking with an instant messaging service, the method comprising:
   acquiring, based on a search request for a message transmitted to a channel registered in the service, a search result of a chatbot server linked to the channel;
   providing an interface for inputting a value of a parameter included in the search result to a terminal of a counselor linked to the channel;
   acquiring an entity corresponding to the parameter based on the message;
   determining a value of the parameter included in the search result based on at least one of the entity acquired based on the message and data input through the interface; and requesting, based on the determined value of the parameter, an instant messaging server configured to provide the service to transmit a response message corresponding to the search result, wherein the entity is a term registered as a general term for the parameter in the chatbot server, wherein the acquiring of the search result of the chatbot server linked to the channel comprises:

creating a counseling center module corresponding to the channel in response to a request for opening a counseling center of the channel;

linking the chatbot server linked to the channel to the counseling center module;

receiving the search request for the message transmitted through a chat room of the channel included in the counseling center module; and acquiring the search result corresponding to the received search request from the chatbot server linked to the counseling center module.

14. A counseling center server interworking with an instant messaging service, comprising at least one processor configured to:

acquire, based on a search request for a message transmitted to a channel registered in the service, a search result of a chatbot server linked to the channel;

provide an interface for inputting a value of at least one parameter included in the search result to a terminal of a counselor linked to the channel;

acquire an entity corresponding to the parameter based on the message;

determine a value of the parameter included in the search result based on at least one of the entity acquired based on the message and data input through the interface; and request an instant messaging server providing the service to transmit a response message corresponding to the search result based on the determined value of the parameter, wherein the entity is a term registered as a general term for the parameter in the chatbot server, wherein the processor is configured to:

in requesting transmission of the response message, activate a transmission request function of the response message in response to determining a value of at least a part of the parameter included in the search result; and request the instant messaging server to transmit the response message in response to the request to transmit the response message received through the interface.

15. The counseling center server of claim 14, wherein the processor is configured to:

in acquiring the entity, acquire, from the chatbot server, a predetermined entity extracted based on a query corresponding to the message;

determine a value of a first parameter mapped to the acquired entity among parameters included in the search result as a value of the acquired entity; and display the value of the first parameter as the value of the acquired entity on the interface.

16. The counseling center server of claim 14, wherein the processor is configured to:

in determining the value of the parameter, receive input of data corresponding to the parameter through the interface;

check whether the input data corresponds to an entity mapped to the parameter; and determine the value of the parameter as the input data based on the check result.

17. The counseling center server of claim 14, wherein the processor is configured to:

in providing the interface, provide the interface comprising a first input window for inputting a value of a first type parameter mapped with a predefined general-purpose entity;

provide the interface comprising a second input window for inputting a value of a second type parameter mapped with a customized entity; and provide the interface comprising a plug-in transmission function for inputting a value of a third type parameter mapped with a predefined plug-in.

18. The counseling center server of claim 17, wherein the processor is configured to, in determining the value of the parameter, determine the value of the third type parameter among parameters included in the search result as data received based on the plug-in.

* * * * *